Oct. 18, 1927.  1,646,275
D. J. CRONK
MEASURING DEVICE
Filed April 12, 1926   3 Sheets-Sheet 1
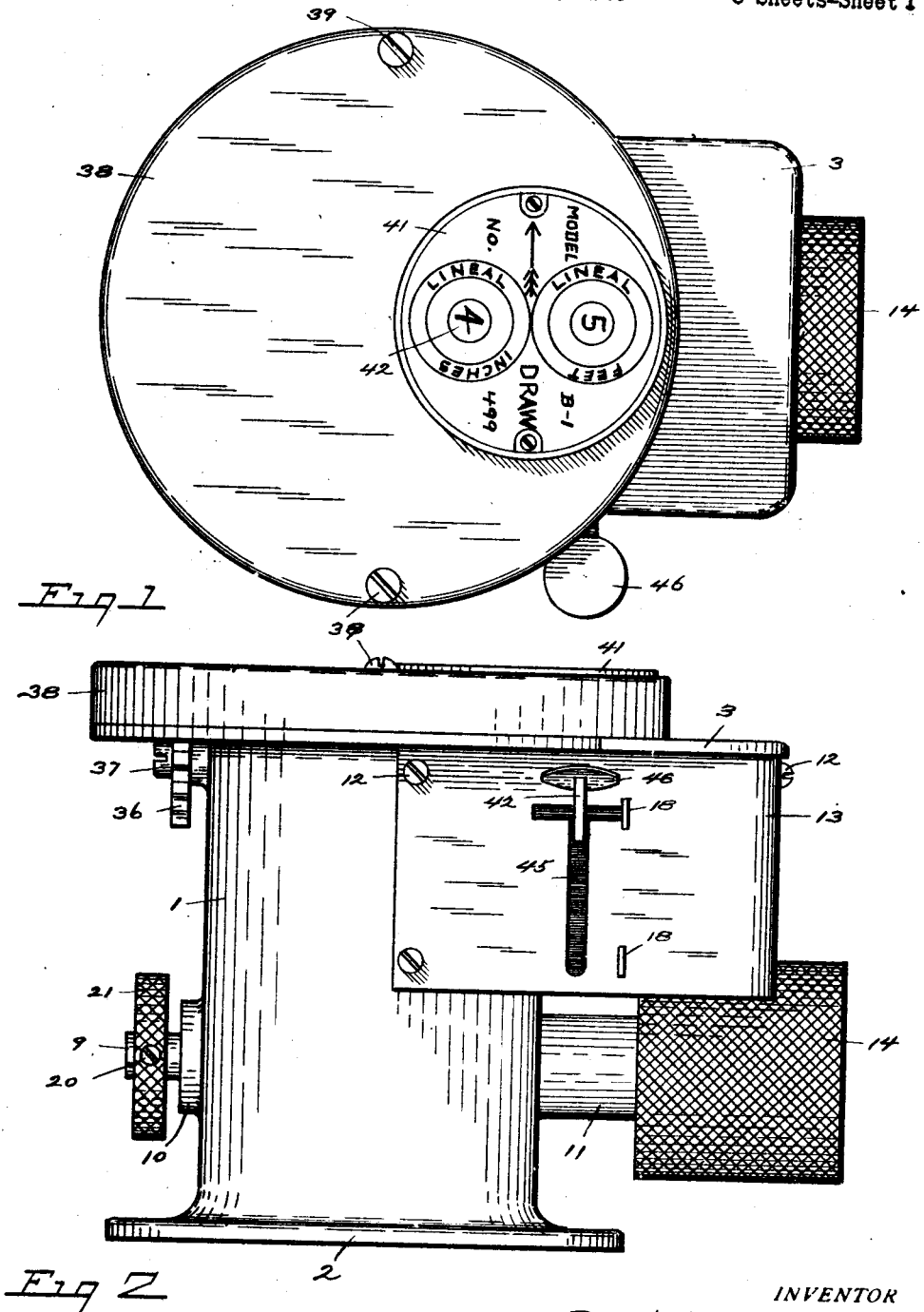
INVENTOR
David James Cronk
BY John J. Thompson
ATTORNEY

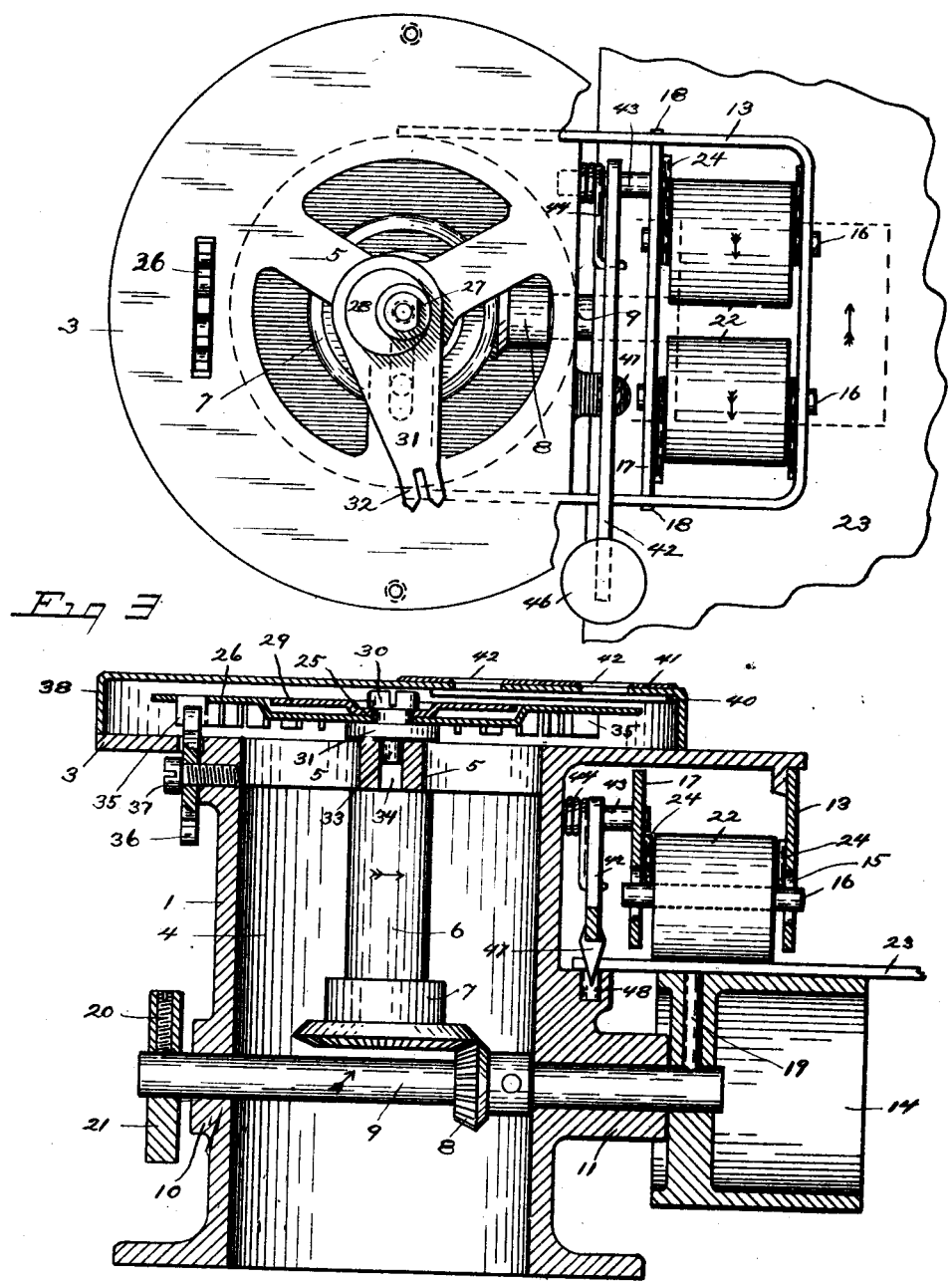

Oct. 18, 1927.
D. J. CRONK
1,646,275
MEASURING DEVICE
Filed April 12, 1926
3 Sheets-Sheet 3
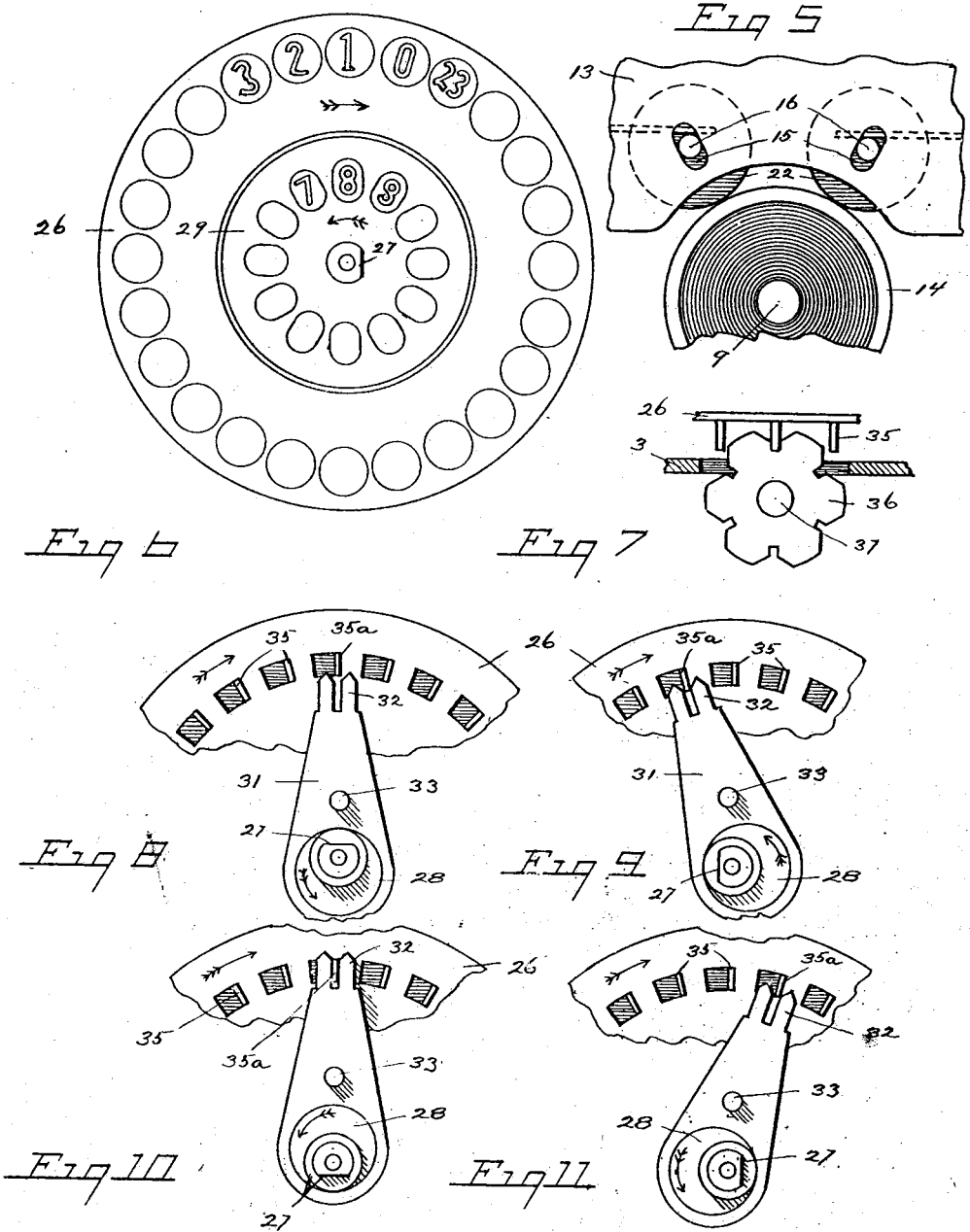
INVENTOR
David James Cronk
BY
John J. Thompson
ATTORNEY Patented Oct. 18, 1927.

1,646,275

UNITED STATES PATENT OFFICE.

DAVID JAMES CRONK, OF POUGHKEEPSIE, NEW YORK.

MEASURING DEVICE.

Application filed April 12, 1926. Serial No. 101,469.

This invention relates to a device for measuring the length of fabric, such as wire cloth, and other suitable materials which it is desired to measure the length of as the same is sold in stores; the device being mounted on the counter or other suitable place and the material to be sold drawn through the device in contact with a roller which by novel mechanism operates dials which indicate the length of fabric passed through said machine in feet and inches.

The object of the invention is to provide a device of this class, that shall be simple of operation, durable and efficient, containing few parts, and adaptable for use with many different kinds of fabric.

Another object being to provide a measuring machine giving a direct reading in feet and inches.

Still another object being to provide in such a machine means for marking the goods when the required length is reached that the measurement may not be lost when the fabric is removed from the machine for cutting.

A further object being to provide re-setting means for re-setting the dials to zero, or backing the same up if any mistake has been made.

With these and other objects in view, my invention consists in certain construction and combination of parts as will hereinafter be fully described and claimed, and illustrated in the accompanying drawings which form a part thereof and in which like figures of reference refer to corresponding parts in all of the views.

In the drawings:—

Figure 1. is a top plan view of the device.

Figure 2. is a side elevation of the same.

Figure 3. is a top plan view with the cover removed, and some of the frame also, to show the pressure rolls and the dial actuating arm.

Figure 4. is a vertical sectional view, showing the construction and operation of the several parts.

Figure 5. is a partial end view, showing the relation of the rollers.

Figure 6. is a top plan view of the dials, (only a few of the numerals being indicated thereon).

Figure 7. is a partial view of the re-setting device.

Figures 8, 9, 10 and 11, show the action of the dial actuating arm in its several positions to rotate the dial step by step.

Referring to the drawings:—

The device comprises a tubular frame 1, formed with a flared base 2 and an overhanging top plate 3; the tubular opening 4 near its top being provided with the spider 5 which is formed with a bearing for the vertical drive shaft 6, the lower end of which is provided with the bevel gear 7 in mesh with and driven by the small gear 8 secured in the horizontal shaft 9 which is rotatably mounted in the bearings 10 and 11 in the side walls of the frame 1.

Under the overhang of the top plate 3 and to the sides of the frame 1 is secured by the screws 12 the U-shaped guard 13 which has its lower edge shaped to conform to the friction roll 14 and is provided with the slotted bearings 15 for the outer ends of the shafts 16 (see Figure 5) the inner ends of said shafts 16 being secured in similar elongated bearings or holes in a cross member 17 which has its ends secured in the sides of said guard 13 as at 18.

The friction roller 14 may be of any suitable material depending on the kind of fabric to be handled, but is here shown as of metal with a knurled surface, and said roller is secured on the outer end of the shaft 9 by the pin 19 or other suitable means; while to the inner end of said shaft 9 is secured by the screw 20 a knurled hand wheel 21 used for operating said shaft 9 by hand.

Mounted on the shafts 16 are the pressure rolls 22, which hold the fabric 23 in frictional contact with the roller 14 so that as the fabric is passed through the machine by the operator the roller 14 will be rotated and thereby rotate the shaft 9 and the gears 7 and 8, the ratio of said gears being such that the shaft 6 will make one-half a turn for one complete turn of the shaft 9; the elongated bearings 15 allow the rollers 22 to admit fabric of different thickness and said rollers 22 are normally given a downward pressure by the springs 24 which press against the shafts 16.

The upper end of the shaft 6 is reduced in diameter where it takes its bearing in the spider 5, and is again reduced as at 25 to take the central hole of the large disk 26, and further reduced in diameter and flattened as at 27 to take the cam 28 and the small disk 29 which are both formed with flattened hole; the end of said shaft 6 also being tapped to receive the locking screw 30.

Mounted on the cam 28 or eccentric is the disk actuating arm 31 which is formed with the bifurcated end 32 and provided with a depending pin 33 which is adapted to slide in a slot 34 which is formed in one of the arms of the spider 5.

Referring to Figures 6, 8, 9, 10 and 11, the large disk 26 is graduated in twenty-four divisions and has a clockwise rotation; while the small disk 29 is divided into 12 places to correspond to inches and has a counter-clockwise rotation.

The lower surface of said disk 26 is provided with teeth 35 which are sheared from the disk and which correspond to the graduations on its upper surface; said teeth being adapted to be engaged by the bifurcated end of the arm 31, which being held from rotation by the pin 33 sliding in the slot 34 is given a floating movement by the rotation of the cam 28, and by referring to the upside down views 8, 9, 10 and 11, it will be seen that during one complete revolution of said cam 28 that said arm 31 first recedes, then swings to the side and engages the tooth 35ª as in Figure 9, next bringing it to the next position as in Figure 10, and lastly to the position shown in Figure 11, where it leaves it and starts to recede during the latter half of one revolution of the cam 28, and it will thus be seen that one tooth is advanced for each rotation of the cam 28 and shaft 6, while the disk 29 being mounted directly on the shaft 6 is rotated one complete revolution, or 12 inches shown by one foot on the large dial.

The re-set wheel 36 which is mounted on the screw 37 threaded into the frame 1, and extends upward through a slot in the top 3, engages the teeth 35 and acts as a brake for the disk 26 to prevent its free movement when the teeth 35 are out of engagement with the bifurcated end of the arm 31, which position it must be brought into by the hand wheel 20 before the dials can be reset.

A drawn cover 38 is provided to enclose the disks, and this cover is secured to the top plate 3 by the screws 39, and is provided with an opening which is covered by a glass 40 and the plate 41 which is formed with the two windows 42 through which the numerals can be seen, and suitable lettering is provided on said plate.

For marking the fabric when the required length has been passed through the machine, there is provided a lever 42 hinged at one end on the shaft 43 and held in a normally raised position by the spring 44, with its end extending through the side of the guard 13 in the slot 45, and provided with the finger plate 46; said lever has secured thereto a prong 47 extending downward and adapted to enter a die 48, when pressed down through the fabric, thus making a hole in the same, so that when the fabric is removed from the machine an indication is left to cut by.

Having thus described my invention, what I claim as new and desire to secure by Letters Patent, is

1. In a measuring machine of the class described, and in combination with a frame having a drive shaft and a driven shaft, of indicating disks carried by one of said shafts, one of said disks driven directly from said shaft, teeth formed on the other disk, and means mounted on and driven by said shaft for engaging said teeth and advancing said disk one tooth at a time, a toothed reset wheel mounted on said frame and engaging the teeth on said disk, for the purpose of rotating said disk independent of the driving means.

2. In a measuring machine of the class described, and in combination with a frame having a driving and a driven shaft, indicating dials for showing the length of fabric passed through said machine, a marking device comprising a lever pivoted to said frame, a prong carried by said lever and a die registering with said prong in such a manner that said prong may be forced through the fabric into said die to mark said fabric.

In testimony whereof I hereunto affix my signature.

DAVID JAMES CRONK.